United States Patent
Merienne et al.

(10) Patent No.: US 9,321,371 B2
(45) Date of Patent: Apr. 26, 2016

(54) METHOD FOR CONTROLLING A POWER TRAIN AND CORRESPONDING CONTROL SYSTEM

(71) Applicant: RENAULT s.a.s., Boulogne-Billancourt (FR)

(72) Inventors: Ludovic Merienne, Villejust (FR); Abdelmalek Maloum, Chevilly la Rue (FR)

(73) Assignee: RENAULT s.a.s., Boulogne-Billancourt (FR)

(*) Notice: Subject to any disclaimer, the term of this patent is extended or adjusted under 35 U.S.C. 154(b) by 7 days.

(21) Appl. No.: 14/360,126

(22) PCT Filed: Nov. 20, 2012

(86) PCT No.: PCT/EP2012/073126
§ 371 (c)(1),
(2) Date: May 22, 2014

(87) PCT Pub. No.: WO2013/076091
PCT Pub. Date: May 30, 2013

(65) Prior Publication Data
US 2014/0309830 A1      Oct. 16, 2014

(30) Foreign Application Priority Data
Nov. 22, 2011  (FR) ..................... 11 60647

(51) Int. Cl.
| | |
|---|---|
| *H02P 21/00* | (2006.01) |
| *H02P 21/05* | (2006.01) |
| *H02P 21/06* | (2006.01) |
| *B60L 15/20* | (2006.01) |

(52) U.S. Cl.
CPC ........ *B60L 15/2072* (2013.01); *H02P 21/0035* (2013.01); *H02P 21/05* (2013.01); *H02P 21/06* (2013.01); *Y02T 10/7258* (2013.01)

(58) Field of Classification Search
CPC ................. H02P 6/00; H02P 25/02
USPC .......................................................... 701/22
See application file for complete search history.

(56) References Cited

U.S. PATENT DOCUMENTS

| | | | | |
|---|---|---|---|---|
| 8,754,603 | B2 * | 6/2014 | Arnett et al. | 318/432 |
| 2002/0175649 | A1 | 11/2002 | Reutlinger | |
| 2005/0073281 | A1 * | 4/2005 | Kerlin et al. | 318/749 |

FOREIGN PATENT DOCUMENTS

JP        09-131100        5/1997

OTHER PUBLICATIONS

International Search Report Issued Jan. 16, 2013 in PCT/EP12/073126 Filed Nov. 20, 2012.
French Search Report Issued Jun. 21, 2012 in French Patent Application No. 1160647 Filed Nov. 22, 2011.

* cited by examiner

Primary Examiner — Nga X Nguyen
(74) Attorney, Agent, or Firm — Oblon, McClelland, Maier & Neustadt, L.L.P

(57) ABSTRACT

A system and method for controlling a power train of a motor vehicle having an electric motor includes regulating the currents in the rotor and stator of the electric motor so that they reach required current values using control signals of the electric motor. The currents to be regulated and the control signals being expressed in a rotating reference frame including a plurality of axes. The control signals result from a transformation including a change of variable allowing the dynamic decoupling of the regulation along each of the axes. Regulating each axis includes an application to the current to be regulated of two different linear operators as a function of the value of the current to be regulated of that axis with respect to its required value, the result of the application of the two linear operators having to be substantially equal to the control signal of that axis.

12 Claims, 2 Drawing Sheets

Time

METHOD FOR CONTROLLING A POWER TRAIN AND CORRESPONDING CONTROL SYSTEM

The technical field of the invention is that of the control of electric motors and, in particular, the control of electric motors of the wound rotor synchronous type.

An electric motor of the wound rotor synchronous type comprises a fixed part called the stator and a moving part called the rotor. The stator comprises three coils offset by 120° and supplied with alternating current. The rotor comprises one coil supplied with direct current. The phase currents of the stator depend on the resistances and inductances of the rotor and of the stator as well as on the mutual inductance between the rotor and the stator.

The control of such a system generally uses correctors of the PI (Proportional Integral) type. An example of use of this type of corrector is provided in the document EP1 341 293.

This being so, this type of corrector can present problems of instability notably when it is desired to have a fast system. In order to avoid instability problems, it is known, according to the prior art, to calculate the parameters of these correctors in such a way as to ensure stability margins. In order to obtain a more robust system, it is known to increase these stability margins and therefore to reduce the performance of the corrector.

It is also known, in the prior art, to use correctors other than Proportional Integral correctors. An example of a corrector not using a Proportional Integral corrector is described in the document U.S. Pat. No. 5,015,937 which describes the open-loop control of a wound rotor synchronous machine with data tables. Another example of a corrector not using a Proportional Integral corrector is described in the document EP 0 702 451 which describes the speed control of a permanent magnet synchronous machine in response to load variations of the motor.

This being so, these systems are not suitable for the motor vehicle field in which the speed of the motor is variable and can be considered as an interference.

A purpose of the present invention is to improve the stability of the regulation of an electric motor of the wound rotor synchronous type without reducing the performance of the corrector.

Another purpose is a regulation which withstands speed variations and maintains the currents at their required values, which makes it possible to have control of the torque supplied by the machine even at variable speed.

There is therefore proposed a controller and a control method for controlling a power train which does not use a Proportional Integral controller.

The invention thus relates to a method for controlling a power train equipping a motor vehicle and comprising an electric motor provided with a rotor and a stator, comprising a regulation of the currents in the rotor and in the stator so that they reach required current values using control signals of the electric motor, said currents to be regulated and said control signals being expressed in a rotating reference frame comprising a plurality of axes, said control signals resulting from a transformation comprising a change of variable allowing the dynamic decoupling of the regulation along each of the axes of said plurality of axes.

According to a general feature, the regulation comprises for each of the axes of said plurality of axes an application, to the current to be regulated of that axis, of two different linear operators as a function of the value of the current to be regulated of that axis with respect to its required value, the result of the application of the two linear operators having to be substantially equal to the control signal of that axis.

Thus, in all cases, it is ensured that the derivative of the current has the correct sign with respect to the required value. Currents always moving towards their required values are obtained.

According to one feature, for each of the axes, the two linear operators comprise an addition of an addition variable, said addition variable being different as a function of the two linear operators, a higher addition variable being used by the linear operator applied when the current of the axis in progress is lower than its required value and a lower addition variable being used by the linear operator applied when the current of the axis in progress is higher than its required value.

The regulation does not therefore necessitate a complicated operator; the difference between the two operators is generally only due to the addition variable.

According to another feature, for each of the axes, the two operators correspond to an equation for the regulation of the current of the axis in progress and the higher and lower addition variables respectively correspond to the maximum and minimum values of a component of said regulation equation for a certain range of variation of the parameters of said component, said component of the regulation equation being added to the difference between the current for the axis in progress and its required value.

The regulation is faster because it always takes account of the worst cases. It is no longer necessary to estimate the average parameters but only to set limits for the latter, which is much simpler. Higher stability is furthermore ensured than with the conventional regulators which do not take account of spreads of parameters. It is thus possible to ensure an effective control when the real parameters of the machine are within the range that has been chosen.

According to another additional feature, for each of the axes, the two linear operators comprise a multiplication between the value of the inductance of the electric motor along the axis in progress, a constant depending on the axis in progress and the difference between the current to be regulated along the axis in progress and its required value.

The operators come directly from the regulation equation describing the operation of an electric motor in a Park reference frame.

According to one implementation, the regulation comprises, for each of the axes, when the current to be regulated along that axis is sufficiently close to its required value, the application of a third linear operator comprising the addition of an addition variable depending on the difference between the current to be regulated along the axis in progress and its required value.

A smoothing of the control is thus carried out when the currents are sufficiently close to their required values in order to eliminate the oscillations due to the two operators used successively.

According to a feature, the addition variable of the third linear operator is determined by carrying out, for a given interpolation window, the interpolation between the higher addition variable and the lower addition variable.

The addition variable of the third operator therefore varies continuously during the change from the first to the third operator or during the change from the second to the third operator.

The invention also relates to a system for controlling a power train equipping a motor vehicle and comprising an electric motor provided with a rotor and a stator, comprising means of regulation of the currents in the rotor and in the stator so that they reach required current values using control signals of the electric motor, said currents to be regulated and said control signals being expressed in a rotating reference frame comprising a plurality of axes, said control signals resulting from a transformation comprising a change of variable allowing the dynamic decoupling of the regulation along each of the axes of said plurality of axes.

According to a general feature, said regulation means comprise, for each of the axes of said plurality of axes, means of application of a first linear operator to the current to be regulated of that axis, means of application of a second linear operator to the current to be regulated of that axis, means of comparison of the value of the current to be regulated of that axis with respect to its required value and management means for activating the means of application of a first operator or the means of application of a second linear operator as a function of the value of the current to be regulated of that axis with respect to its required value, the result of the application of the two linear operators having to be substantially equal to the control signal of that axis.

According to a feature, for each of the axes, the two linear operators comprise an addition of an addition variable, said addition variable being different as a function of the two linear operators, a higher addition variable being used by the linear operator applied when the current of the axis in progress is lower than its required value and a lower addition variable being used by the linear operator applied when the current of the axis in progress is higher than its required value.

According to another feature, for each of the axes, the two operators correspond to an equation for the regulation of the current of the axis in progress and the higher and lower addition variables correspond respectively to the maximum and minimum values of a component of said regulation equation for a certain range of variation of the parameters of said component, said component of the regulation equation being added to the difference between the current for the axis in progress and its required value.

According to another additional feature, for each of the axes, the two linear operators comprise a multiplication between the value of the inductance of the electric motor along the axis in progress, a constant depending on the axis in progress and the difference between the current to be regulated along the axis in progress and its required value.

According to one embodiment, for each of the axes, the regulation means comprise means of application of a third linear operator capable of applying a third linear operator comprising the addition of an addition variable to the current along that axis, said addition variable depending on the difference between the current along that axis and its required value and the management means are configured, when the current to be regulated along that axis is sufficiently close to its required value, to activate the means of application of the third linear operator.

According to a feature, the addition variable of the third linear operator is determined, for a given interpolation window, by carrying out the interpolation between the higher addition variable and the lower addition variable.

Other purposes, features and advantages will become apparent on reading the following description, given solely as a non-limiting example with reference to the appended drawings in which.

Figure 1:
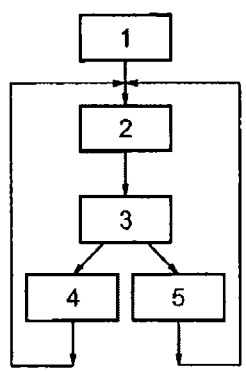
FIG. 1 shows a method for controlling an electric power train.

In order to provide the regulation of a power train comprising a synchronous motor comprising a stator and a rotor and equipping a vehicle, a Park reference frame is used, which makes it possible to express the electrical values in a rotating reference frame for example linked with the rotor in the case of a synchronous motor. This reference frame comprises three axes: d, q, and f. The axes d and q are associated with the stator and the axis f is associated with the rotor.

The control signals of the electric motor $V_d$, $V_q$, $V_f$ and the required values of current applied $I_d$, $I_q$, $I_f$ correspond to the components of a control signal and of a current respectively along the axes d, q, f.

In the Park reference frame, a power train comprising a synchronous motor is governed by the following equations:

$$V_d = R_s \cdot I_d + L_d \cdot \frac{dI_d}{dt} + M_f \cdot \frac{dI_f}{dt} - \omega_r \cdot L_q \cdot I_q \qquad \text{(Eq. 1)}$$

$$V_q = R_s \cdot I_q + L_q \cdot \frac{dI_q}{dt} + \omega_r(L_d \cdot I_d + M_f \cdot I_f)$$

$$V_f = R_f \cdot I_f + L_f \cdot \frac{dI_f}{dt} + \alpha \cdot M_f \cdot \frac{dI_d}{dt}$$

where:

$L_d$ is the equivalent armature inductance on the axis d.

$L_q$ is the equivalent armature inductance on the axis q.

$L_f$ is the inductance of the rotor.

$R_s$ is the equivalent resistance of the stator windings.

$R_f$ is the resistance of the rotor.

$M_f$ is the mutual inductance between the stator and the rotor.

$I_d$ is the current on the axis d.

$I_q$ is the current on the axis q.

$I_f$ is the current on the axis f.

$\omega_r$ is the speed of rotation of the magnetic field of the machine (as it is a synchronous machine, it is equal to the speed of rotation of the rotor multiplied by the number of pairs of poles of the machine) (in rad/s).

$V_d$ is the control signal of the electric motor along the axis d.

$V_q$ is the control signal of the electric motor along the axis q.

$V_f$ is the control signal of the electric motor along the axis f.

$\alpha$ is a coefficient, $\alpha=3/2$ preferably.

The principal difficulties presented by the control of this type of system are due to the dynamic coupling between the axes d and f.

In order to avoid the dynamic coupling between the axes d and f, a change of variables is provided: $(\tilde{V}_d, \tilde{V}_q, \tilde{V}_f) = S(V_d, V_q, V_f)$, using the following equation:

$$V_d = \tilde{V}_d - \frac{M_f}{L_f} \cdot \left( R_f \cdot I_f + \frac{\alpha \cdot M_f}{L_d} \cdot (\omega_r \cdot L_q \cdot I_q - R_s \cdot I_d) - \tilde{V}_f \right) \qquad \text{(Eq. 2)}$$

$$V_q = \tilde{V}_q$$

$$V_f = \tilde{V}_f + \frac{\alpha - M_f}{L_d} \cdot \tilde{V}_d$$

The system to be controlled can therefore be represented by the following regulation equation:

$$\tilde{V}_d = R_s \cdot I_d + L_d \cdot \frac{dI_d}{dt} - \omega_r \cdot L_q \cdot I_q \quad \text{(Eq. 3)}$$

$$\tilde{V}_q = R_s \cdot I_q + L_q \cdot \frac{dI_q}{dt} + \omega_r \cdot (L_d \cdot I_d + M_f \cdot I_f)$$

$$\tilde{V}_f = R_f \cdot I_f + L_f \cdot \frac{dI_f}{dt} - \frac{\alpha \cdot M_f}{L_d} \cdot (R_s \cdot I_d - \omega_r \cdot L_q \cdot I_q)$$

where:
$\tilde{V}_d$ is the decoupled stator voltage on the axis d.
$\tilde{V}_q$ is the stator voltage on the axis q.
$\tilde{V}_f$ is the decoupled voltage of the rotor.
and $\alpha=3/2$ preferably.

Thus, according to this regulation equation it is possible to control, with a voltage along the axis d ($\tilde{V}_d$), the derivative component of the current along the axis d ($I_d$) uniquely. Similarly, the voltage along the axis q ($\tilde{V}_q$) and the voltage of the rotor ($\tilde{V}_f$) along the axis f depend on the derivatives of the current only by the component of the current along the axis q ($I_q$) and along the axis f ($I_f$) respectively. The dynamic couplings between the axes d, q, f are therefore eliminated in the regulator which uses this regulation equation.

As can be seen, there is no change of variable on the axis q which does not exhibit dynamic coupling. The dynamic coupling is between the axes d and f, hence the new decoupled controls on these two axes.

The following can be noted in the new space:

$$\tilde{V}_d = A_d + L_d \cdot \frac{dI_d}{dt} \quad \text{(Eq. 4)}$$

$$\tilde{V}_q = A_q + L_q \cdot \frac{dI_q}{dt}$$

$$\tilde{V}_f = A_f + L_f \cdot \frac{dI_f}{dt}$$

where $$A_d = R_s I_d - \omega_r L_q I_q$$

$$A_q = R_s I_q + \omega_r (L_d I_d + M_f I_f)$$

$$A_f = R_f I_f - \frac{\alpha M_f}{L_d}(R_s I_d - \omega_r L_q I_q)$$

The terms $A_d$, $A_q$, $A_f$ depend on parameters such as the inductances, the resistances and the mutual inductance. A range of possible variation is defined for each parameter for each axis:

$R_s \in [R_{s_{min}}; R_{s_{max}}], \omega_r \in [\alpha <_{f_{min}}; \omega_{r_{max}}]$ and $L_q \in [L_{q_{min}}; L_{q_{max}}]$. Axis d:

$R_s \in [R_{min}; R_{s_{max}}], \omega_r \in [\omega_{r_{min}}; \omega_{r_{max}}], M_f \in [M_{r_{min}}; M_{f_{max}}]$ and $L_d \in [L_{d_{max}}]$. Axis q:

$R_f \in [R_{r_{min}}; R_{f_{max}}], R_s \in [R_{s_{min}}; R_{s_{max}}], M_f \in [M_{f_{min}}; M_{f_{max}}], \omega_r \in [\omega_{r_{min}}; \omega_{r_{max}}], L_q \in [L_{q_{min}}; i_{q_{max}}]$ and $L_d \in [i_{,min}; L_{f_{max}}]$. Axis f:

With these ranges, it is possible to calculate, for the axis d, the components $A_d^-$ and $A_d^+$ corresponding to the minimum and to the maximum value that the term $A_\alpha$ can have for a given triplet $I_d, I_q, I_f$; similarly, for the axis q, the components $A_q^-$ and $A_q^+$ corresponding to the minimum and to the maximum value that the term $A_q$ can have for a given triplet $I_d, I_q, I_f$ and finally, for the axis f, the components $A_f^-$ and $A_f^+$ corresponding to the minimum and to the maximum value that the term $A_f$ can have for a given triplet $I_d, I_q, I_f$.

If the parameters are actually within the defined ranges, then the following must be true:

on the axis d: $A_d^- \leq A_d^{real} \leq A_d^+$
on the axis f: $A_f^- \leq A_f^{real} \leq A_f^+$
on the axis q: $A_q^- \leq A_q^{real} \leq A_q^+$ The principle of the control is therefore based on the following equations:

$$\tilde{V}_d = \begin{cases} A_d^- - \lambda_d L_{d_{max}}(I_d - I_d^c) & I_d \geq I_d^c \\ A_d^+ - \lambda_d L_{d_{max}}(I_d - I_d^c) & I_d \leq I_d^c \end{cases} \quad \text{(Eq. 5)}$$

$$\tilde{V}_q = \begin{cases} A_q^- - \lambda_q L_{q_{max}}(I_q - I_q^c) & I_q \geq I_q^c \\ A_q^+ - \lambda_q L_{q_{max}}(I_q - I_q^c) & I_q \leq I_q^c \end{cases} \text{ if}$$

$$\tilde{V}_f = \begin{cases} A_f^- - \lambda_f L_{f_{max}}(I_f - I_f^c) & I_f \geq I_f^c \\ A_f^+ - \lambda_f L_{f_{max}}(I_f - I_f^c) & I_f \leq I_f^c \end{cases}$$

where $I_d^c$, $I_q^c$ and $I_f^c$ are the required values of current on each of the axes.

Thus, in all cases, the derivative of the current has the correct sign with respect to the required value. For example, on the axis d in the case where $I_d \geq I_d^c$ and according to (4) and (5):

$$L_d \cdot \frac{dI_d}{dt} = \tilde{V}_d - A_d^{real} = A_d^- - A_d^{real} - \lambda_d L_{d_{max}}(I_d - I_d^c) \leq 0$$

Currents always moving towards their required values are therefore obtained.

An example of the regulation method using the above equations for one of the axes is shown in FIG. 1.

This control method makes is possible, from control signals of one of the axes $\tilde{V}_d$, $\tilde{V}_q$ or $\tilde{V}_f$, to control the currents to be regulated of the corresponding axis $I_d$, $I_q$ or $I_f$ in such a way as to meet the required values of current $I_d^C$, $I_q^C$ or $I_f^C$ corresponding to the torque requirements at the wheel. The following description of the method relates to the axis q; this being so, the method relating to the axis d or f is similar.

The method comprises:

a first step 1 of acquisition of the required values of current, namely the required value $I_q^C$ which is the required value of the stator current on the axis q;

a second step 2 during which the current along the axis q, $I_q$ is measured;

a third step 3 during which the current $I_q$ measured along the axis q is compared with its required value $I_q^C$.

If the measured current is higher than its required value $I_q^C$ then step 4 is initiated whereas, if the measured current is lower than its required value $I_q^C$, then step 5 is initiated.

Step 4 corresponds to the application of a linear operator OP1q to the current along the axis q according to the equation:

$$A_q^- - \lambda_q L_{q_{max}}(I_q - I_q^c) \text{ for } I_q \geq I_q^c,$$

Similarly, step 5 corresponds to the application of a linear operator OP2q to the current along the axis q according to the equation:

$$A_q^+ - \lambda_q L_{q_{max}}(I_q - I_q^c) \text{ pour } I_q \leq I_q^c,$$

According to the equation 5 (Eq. 5), the result of the application of the operators OP1q and OP2q must be equal to $\tilde{V}_q$; it is therefore possible, with step 4 or step 5, to control the current $I_q$ by varying $\tilde{V}_q$. In other words, $I_q$ is controlled indirectly by controlling the result of the operators OP1q and OP2q.

After carrying out step 4 or 5, the method returns to step 2.

Figure 2:
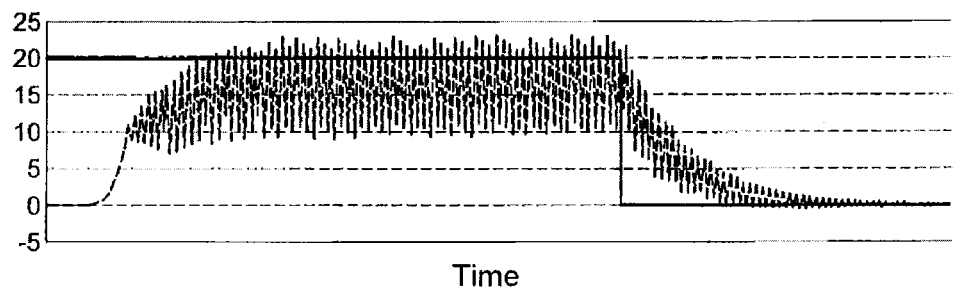
FIG. 2 shows the result of the method shown in FIG. 1.

FIG. 2 shows the result of a control of the current according to a method such as shown in FIG. 1. FIG. 2 comprises a reference frame comprising two axes: a horizontal axis representing time and a vertical axis representing the current expressed in amps. In this reference frame there is a first rectangular curve that represents the required value $I_q^C$ and a second curve which oscillates and which represents the current $I_q$. It can be seen that the current $I_q$ will approach the required value $I_q^C$ but does so whilst making many oscillations about the required value.

In fact, the problem of this regulator is that it operates at a certain frequency and, however high this frequency may be, it does not allow a control applied and calculated in a continuous manner. Thus, the current will therefore oscillate about the required value; the control will jump each time as a function of the application of the operator OP1q or OP2q.

In order to eliminate the oscillations, according to an improvement of the method shown in FIG. 1, a smoothing of the control is carried out by carrying out a linear interpolation between the two values $A_q^-$ and $A_q^+$ when the currents are sufficiently close to their required values.

Figure 3:
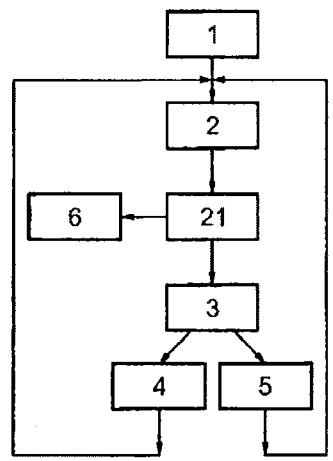
FIG. 3 shows an embodiment of an operator.

An example of the improved regulation method is shown in FIG. 3. The following description of the method relates to the axis q; this being so, the method relating to the axis d or f is similar.

In addition to the steps 1, 2, 3, 4, 5 which are identical to those of the method shown in FIG. 1, the method shown in FIG. 3 comprises:

a step 21 of comparison of the current along the axis q $I_q$ with its required value $I_q^C$. During this step it is tested if $|I_q - I_q^C| \le \epsilon_q$, where $e_q$ is the value of an interpolation window (described in detail below). It is thus tested if the current $I_q$ is sufficiently close to its required value $I_q^C$; and a step 6 during which, if the current $I_q$ is sufficiently close to its required value $I_q^C$, an operator OP3q, which is described below with reference to FIG. 4, is applied.

On the contrary, if the current $I_q$ is not sufficiently close to its required value $I_q^C$ then the method progresses to steps 3, 4 and 5.

The result of the application of the operator OP3q must, according to the equation 5 (Eq. 5), be equal to $\tilde{V}_q$. It is therefore possible, with step 6 of FIG. 3 and in a way identical to steps 4 and 5, to control the current $I_q$ by varying $\tilde{V}_q$.

Figure 4:
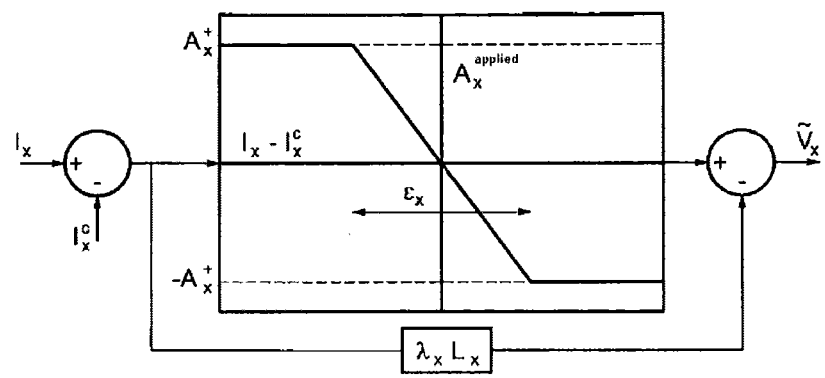
FIG. 4 shows another method for controlling an electric power train.

FIG. 4 shows an embodiment of an operator OP3x with x taking the values d, q, or f for each of the axes. It comprises:

a subtractor for subtracting the current of required value $I_x^C$ from the current to be regulated $I_x$;

a module $X_r L_{r_{max}}$ for multiplying the result of the subtraction by $X_r L_{r_{max}}$ ($L_{x_{max}}$ being the maximum value of the inductance along the axis x, with x taking the value d, q or f); and an interpolation module in which the addition variable $A_x^{applied}$ is determined. This addition variable notably depends on the difference between the current to be regulated $I_x$ and its required value $I_x^C$. It is the result of the interpolation between $A_x^+$ and $A_x^-$ or a given interpolation window $\epsilon_x$. In other words, when the absolute value of the difference between the current to be regulated $I_x$ and its required value $I_x^C$ is lower than $\epsilon_x$ then the value of the addition variable $A_x^{applied}$ is determined by multiplying said difference by the slope of the straight line connecting the two straight lines of ordinate values $A_x^-$ and $A_x^+$. These two straight lines represent the addition variables of the operators OP1x and OP2x (OP2x of ordinate value $A_x^+$ and OP1x of ordinate value $A_x^+$) when the absolute value of the difference between the current to be regulated $I_x$ and its required value $I_x^C$ is higher than $\epsilon_x$. A value of the addition variable of OP3x is therefore obtained which varies continuously during the change from the operator OP1x to the operator OP3x or from the operator OP2x to the operator OP3x.

Thus, for each of the three axes d, q and f, the applied operator is: $A_x^{applied} - \lambda_x L_x L_{inM} (I_x - \Gamma_x)$, with x taking the values d, q and f.

Two parameters therefore have to be defined for each axis: the proportional component $\lambda_x$ and the amplitude of the linear interpolation $\epsilon_x$. It is also necessary to estimate the range of variation of the parameters in order to ensure the operation of the control.

A control is therefore available which ensures the correct variation of the current without using an integral term which would have the disadvantage of diverging in the case of error in a parameter.

Figure 5:
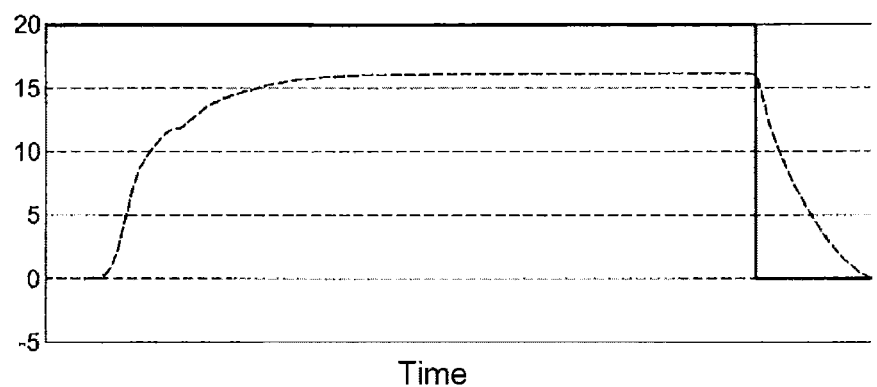
FIG. 5 shows the result of the control method shown in FIG. 4.

FIG. 5 shows the result of a control of the current according to a method such as described in FIG. 3. The reference frame in FIG. 5, identical to that in FIG. 2, comprises a first rectangular curve which represents the required value $I_q^C$ and a second rounded curve which represents the current $I_q$. It can be seen that the current $I_q$ will approach the required value $I_q^C$ without the oscillations about the required value seen in FIG. 2.

Figure 6:
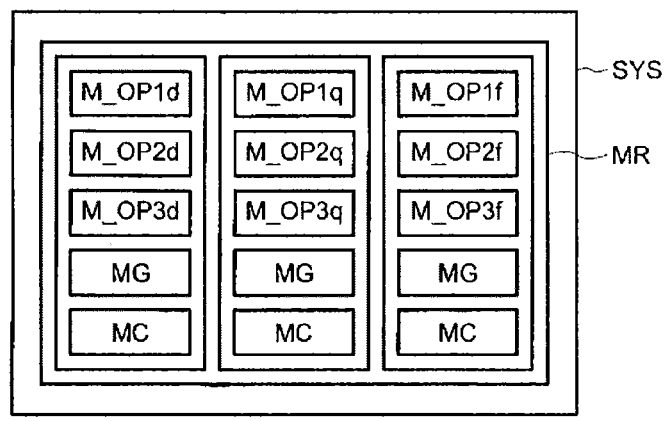
FIG. 6 shows a control system using the method shown in FIG. 4.

FIG. 6 shows a control system SYS making it possible to implement the method shown in FIG. 3. The system SYS comprises means of regulation MR of the currents $I_d$, $I_q$, $I_f$ in the rotor and in the stator.

The regulation means MR comprise, for the axis d:

means of application to the current to be regulated of the axis d $I_d$ of three different linear operators M_OP1d, M_OP2d and M_OP3d;

means of comparison MCd of the value of the current $I_d$ with its required value $I_d^C$; and management means MGd configured to activate the means M_OP1d and M_OP2d as a function of the value of the current $I_d$ with respect to its required value $I_d^C$. The management means MGd are also configured, when the current to be regulated $I_d$ is sufficiently close to its required value $I_d^c$, to activate the means of application M_OP3d.

Similarly, the regulation means MR comprise, for the axis q and for the axis f:

means of application, to the current to be regulated of the axis q on the one hand and of the axis f on the other hand, of three different linear operators: M_OP1q, M_OP2q, M_OP3q and M_OP1f, M_OP2f and M_OP3f;

means MCq for comparing the value of the current $I_q$ with its required value $I_q^C$ and means MCf for comparing the value of the current $I_f$ with its required value $I_f^C$;

management means MGq configured to activate the means M_OP1q and M_OP2q as a function of the value of the current $I_q$ with respect to its required value $I_q^C$ and means MGf configured to activate the means M_OP1f, M_OP2f as a function of the value of the current $I_f$ with respect to its required value $I_f^c$. The management means MGq are also configured to activate the means of application M_OP3q when the current to be regulated $I_q$ is sufficiently close to its required value $I_q^C$ and the management means MGf are also configured to activate the means of application M_OP3f when $I_f$ is sufficiently close to its required value $I_f^C$.

This regulation strategy has the advantage of always varying the currents in the direction of the required value provided that the real parameters of the machine are within the range that has been chosen. Greater stability is therefore provided than with conventional regulators which do not take account of spreads of parameters.

Moreover, the regulation is faster because it always takes account of the worst cases. It is no longer necessary to estimate the average parameters but only to set limits for the latter, which is much simpler.

The invention claimed is:

1. A method for controlling a power train equipping a motor vehicle and including an electric motor provided with a rotor and a stator, the method comprising:
   measuring, using a processor, respective currents associated with the rotor and stator; and
   regulating, using the processor, the respective currents in the rotor and in the stator without integration so that the currents reach required current values using control signals of the electric motor, said currents to be regulated and said control signals being expressed in a rotating reference frame comprising a plurality of axes, said control signals resulting from a transformation comprising a change of variable allowing dynamic decoupling for the regulation along each of the axes of said plurality of axes,
   wherein said regulating using the processor includes, for each of the axes of said plurality of axes:
      comparing the value of the current to be regulated of that axis with respect to its required value, and
      selectively applying one of a first linear operator to the current to be regulated of that axis and a second linear operator to the current to be regulated of that axis as a function of the value of the current to be regulated of that axis with respect to its required value based on said comparing, the result of said selective applying one of the two linear operators being substantially equal to the control signal of that axis.

2. The method as claimed in claim 1, wherein for each of the axes, the first and second linear operators each comprise an addition of an addition variable, said addition variable being different as a function of the first and second linear operators, a higher addition variable being used by one of the first and second linear operators applied when the current of the axis in progress is lower than its required value and a lower addition variable being used by the other of the first and second linear operators applied when the current of the axis in progress is higher than its required value.

3. The method as claimed in claim 1, wherein for each of the axes, the first and second linear operators correspond to an equation for said regulating the current of the axis in progress and the higher and lower addition variables respectively correspond to maximum and minimum values of a component of said regulation equation for a certain range of variation of parameters of said component, said component of the regulation equation being added to a difference between the current for the axis in progress and its required value.

4. The method as claimed in claim 2, wherein for each of the axes, the first and second linear operators each comprise a multiplication between a value of an inductance of the electric motor along the axis in progress, a constant depending on the axis in progress and a difference between the current to be regulated along the axis in progress and its required value.

5. The method as claimed in claim 2, wherein said regulating includes, for each of the axes, when the current to be regulated along that axis is within a predetermined amount to its required value, applying a third linear operator comprising addition of an addition variable depending on a difference between the current to be regulated along the axis in progress and its required value.

6. The method as claimed in claim 5, wherein the addition variable of the third linear operator is determined by carrying out, for a given interpolation window, interpolation between the higher addition variable and the lower addition variable.

7. A system for controlling a power train equipping a motor vehicle and including an electric motor provided with a rotor and a stator, the system comprising:
   circuitry configured to
   measure respective currents associated with the rotor and stator, and
   regulate the respective currents of the rotor and the stator without integration so that the currents reach required current values using control signals of the electric motor, said currents to be regulated and said control signals being expressed in a rotating reference frame comprising a plurality of axes, said control signals resulting from a transformation comprising a change of variable allowing dynamic decoupling for the regulation along each of the axes of said plurality of axes,
   wherein the regulation by the circuitry includes, for each of the axes of said plurality of axes:
   comparing the value of the current to be regulated of that axis with respect to its required value, and
   selectively applying one of a first linear operator to the current to be regulated of that axis and a second linear operator to the current to be regulated of that axis as a function of the value of the current to be regulated of that axis with respect to its required value based on said comparing, the result of said selective applying one of the two linear operators being substantially equal to the control signal of that axis.

8. The system as claimed in claim 7, wherein, for each of the axes, the first and second linear operators each comprise an addition of an addition variable, said addition variable being different as a function of the first and second linear operators, a higher addition variable being used by one of the first and second linear operators applied when the current of the axis in progress is lower than its required value and a lower addition variable being used by the other of the first and second linear operators applied when the current of the axis in progress is higher than its required value.

9. The system as claimed in claim 8, wherein, for each of the axes, the first and second linear operators correspond to an equation for the regulation of the current of the axis in progress, and the higher and lower addition variables correspond respectively to maximum and minimum values of a component of said regulation equation for a certain range of variation of parameters of said component, said component of the regulation equation being added to a difference between the current for the axis in progress and its required value.

10. The system as claimed in claim 8, wherein, for each of the axes, the first and second linear operators each comprise a multiplication between a value of an inductance of the electric motor along the axis in progress, a constant depending on the axis in progress, and a difference between the current to be regulated along the axis in progress and its required value.

11. The system as claimed in claim 8, wherein, for each one of the axes, the circuitry is configured to apply a third linear operator comprising addition of an addition variable to the current along that axis, said addition variable depending on a difference between the current along that axis and its required value when the current to be regulated along that axis is sufficiently close to its required value.

12. The system as claimed in claim 11, wherein the addition variable of the third linear operator is determined, for a given interpolation window, by carrying out interpolation between the higher addition variable and the lower addition variable.

* * * * *